July 30, 1935.  A. H. SIMONDS  2,009,529
AIR CONDITIONING APPARATUS AND CONTROL THEREFOR
Filed Jan. 24, 1933
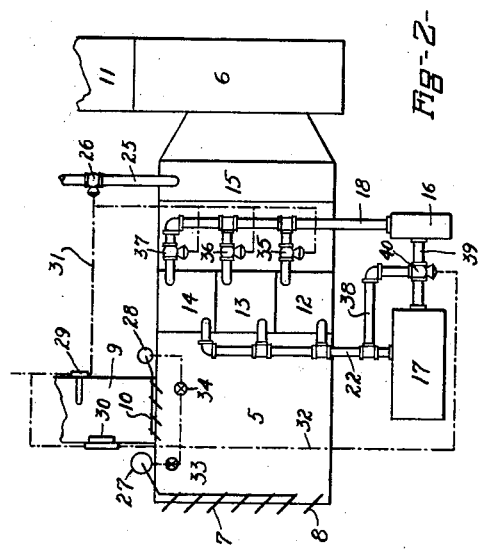
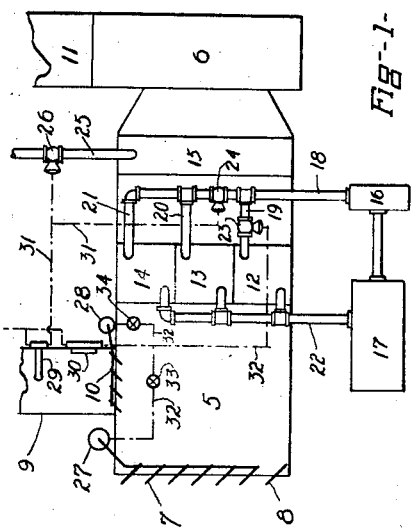
INVENTOR.
Abraham Homer Simonds
BY
ATTORNEYS.

Patented July 30, 1935

2,009,529

UNITED STATES PATENT OFFICE 2,009,529

AIR CONDITIONING APPARATUS AND CONTROL THEREFOR

Abraham Homer Simonds, Los Angeles, Calif., assignor, by mesne assignments, to Auditorium Conditioning Corporation, Jersey City, N. J., a corporation of New Jersey Application January 24, 1933, Serial No. 653,239

2 Claims. (Cl. 257—8)

This invention relates to a method of and a means for conditioning gaseous fluids, and more particularly, to a method of controlling the temperature and humidity thereof.

The general object of the invention is to provide a method of conditioning air which comprises cooling and dehumidifying a portion of the total volume of air circulated and utilizing the remaining portion to reheat the dehumidified portion.

Another object of the invention is to provide a system of control whereby the proportion of dehumidified air and non-dehumidified air may be varied in accordance with changes in temperature and variations in heat load.

Still a further object of the invention is to provide a means of utilizing natural cooling processes to a maximum degree in the conditioning of air, thereby effecting a saving in the amount of artificial refrigeration consumed.

A feature of the invention resides in the provision of a conditioning unit in which the volume of the temperature affecting medium may be varied automatically to produce different degrees of conditioning.

Another feature of the invention resides in the use of a conditioning unit through which the entire volume of air circulated is passed, thereby tending to prevent changes in the volume and changes in pressure of the air delivered by the fan, hence preventing drafts in the conditioned space.

A further feature of the invention resides in the provision of means to vary the temperature of the conditioning medium as well as the volume thereof, and also, the volume of air cooled and dehumidified.

Other objects and features making for economy and simplicity both in the construction and operation of apparatus adapted to carry out the method of applying the invention will be more apparent from the following description of illustrative forms of the invention to be read in connection with the accompanying drawing in which:

Fig. 1 is a diagrammatic view of a combination of apparatus adapted to carry out my invention; and Fig. 2 is a similar view incorporating a modified control arrangement.

Considering the drawing, similar designations referring to similar parts, and first referring to Fig. 1, numeral 5 designates generally an air conditioner; a fan 6 is adapted to draw a mixture of outside air through an opening in the unit controlled by the dampers 7 and 8, and return air from the space to be conditioned (not shown) through the duct 9, under the control of dampers 10. The air is drawn through the conditioning unit 5 and delivered through duct 11 to the enclosure to be conditioned.

Within the unit are mounted a plurality of cooling coils (three being shown for purposes of illustration) 12, 13 and 14, and a heating coil 15. A pump 16 is adapted to draw a cooling fluid, either water, brine, alcohol or the like, through the refrigeration machine 17 and deliver the fluid through pipes 18, 19, 20 and 21 to the individual cooling coils 12, 13 and 14, as illustrated. The pipe 22 provides a return passage, common to all the coils, to the refrigerating machine 17.

A diaphragm valve 23 is positioned in the pipe 19 to control the admission of cooling fluid to the coils 12, and similarly, a diaphragm valve 24, positioned in the pipe 18 is adapted to vary the flow of the cooling medium to and in coils 13 and 14. Under winter or other conditions when the operation of reheater 15 is required, steam or other heating medium is admitted to the coils 15 through pipe 25 under the control of valve 26.

Valves 23 and 24 are of the type in which the closure member of the valve is operatively connected to a suitable diaphragm. Normally, the closure member is held against its seat under the influence of a spring. The diaphragm is subjected to the pressure of compressed air or other fluid, and an increase in this pressure, above a predetermined value, causes the diaphragm to move the closure member of the valve away from its seat, thereby opening the valve. Valve 26 is of the same general type, but differs from valves 23 and 24 in that it is normally held open by a spring and closes under the action of increasing fluid pressure on its operating diaphragm.

As previously noted, dampers 7 and 8 control an opening in the unit through which outside air may be drawn. As contemplated in this invention, damper 8 is adapted to be manually adjusted to control the admission of a constant desired volume of outside air. Dampers 7 are operatively connected to a suitable motor, in this case a pressure operated motor, designated 27, in such a manner that the opening and closing of the dampers may be accomplished automatically, as will be hereinafter described. Dampers 7 are normally held closed as by a spring and are adapted to be opened in response to an increase in pressure in its associated motor 27. Similarly, dampers 10, designed to vary the volume of air returned from the space to be conditioned to the air conditioner 5, are operatively connected to a pressure operated motor 28. The dampers are normally held open, as by a spring, and are closed upon an increase in pressure in motor 28.

In the duct 9, through which air from the enclosure is returned to the conditioner, are mounted thermostat 29 and hygrostat 30. The thermostat 29 is of the type in which a thermostatic element, responding to changes in temperature within duct 9, is adapted to open or close a valve, hence varying the pressure of compressed air, from a suitable source, in a line associated therewith. In this instance, the thermostat 29 is adapted to vary the air pressure in the pipe, represented by the broken line 31, leading to steam valve 26 and to valve 24.

The hygrostat 30 is of well known type in which a hygroscopic member is adapted to stretch or shrink depending on the moisture content of air affecting the member. In this instance, the hygroscopic member is subjected to the influence of return air in the duct 9, and hence, responds to changes in atmospheric conditions within the enclosure. The hygroscopic member is adapted to vary the pressure in air line 32, leading to the damper motors 27 and 28 and to the valve 23. Hand valves 33 and 34 are provided for the purpose of closing off air pressure to damper motors 27 and 28 respectively.

The operation of the thermostat and hygrostat controlling the temperature and humidity of air delivered to the enclosure by the fan 16 under summer operating conditions will now be described. Preliminary to summer operation, the following preparatory steps should be taken. The damper 8 is manually opened, so that fan 16 may draw a constant quantity of outside air for ventilating purposes. The hand valves 33 and 34 are closed, hence dampers 7 will be retained closed and the dampers 10 retained open, their normal positions.

Hygrostat 30 is adjusted so that when the relative humidity in duct 9 is above a predetermined value, for example 50%, the air pressure in line 32 is sufficient to start opening valve 23, hence admitting cold water from the refrigerating machine 17 to cooling coil 12. If desired, the valve may be arranged to open fully instead of gradually when the relative humidity of air in the enclosure rises above a desired point. Since the coil 12 serves only part of the unit 5, it is apparent that only a part of the total volume of air passing through the unit will contact this surface. The portion of the air that does contact coil 12 will be cooled and dehumidified while the remaining portion will be unaffected by coil 12. This dehumidified volume of air will mix with and vary the moisture content of the remaining untreated air passing through the conditioner so that the total volume of air will be attemperated and have its relative humidity lowered. The primary purpose of coil 12 is to control the relative humidity of the total volume of air delivered by the fan 16 by regulating the dehumidification of the air contacting therewith.

The thermostat 29 is primarily adapted to control variations in temperature of the air passing through the conditioner in accordance with changes in temperature of the return air. The thermostat controls valve 24 serving coils 13 and 14, and under winter operating conditions, operates valve 26 controlling the admission of steam to reheater 15. Valve 24 is normally held closed and valve 26 normally held open, as by springs. Under different pressures, these valves may be arranged to assume different positions and open and close as desired.

As the temperature increases in duct 9, the thermostatic element of thermostat 29 tends to increase the pressure in line 31. As the temperature rises above 70° F., for example, valve 24 will begin to open, thereby admitting cooling fluid from the refrigerating machine 17 to coils 13 and 14. Any air which contacts these coils will be cooled and to some extent dehumidified, thereby still further attemperating the air delivered by the fan 6 to the enclosure. If, on the other hand, the temperature in the room starts to decrease, this decrease will be reflected in the duct 9. The thermostat 29 would then act to decrease the pressure in line 31, whereupon valve 24 would begin to close and decrease the amount of cooling fluid admitted to the coils. Likewise, if the humidity in the room fell, hygrostat 30 would respond and cause valve 19 to start closing, or to close, depending on whether the valves were graduated or quick acting.

Under winter operating conditions, refrigerating machine 17 and pump 10 would be inoperative, hand valves 33 and 34 opened, and the setting of damper 8 changed as desired. Opening the valves 33 and 34 will subject damper motors 27 and 28 and associated dampers 7 and 10 respectively to the control of hygrostat 30. The steam valve 26 for heater 15, will be under control of thermostat 29.

The operation of thermostat 29 and hygrostat 30 to control the temperature and humidity of air delivered to the enclosure by fan 6 during the winter and intermediate seasons is as follows.

As the temperature within the conditioned spaced decreases, this decrease will be reflected in the return duct 9. As the temperature drops, the thermostat 29 will act to reduce the air pressure in line 31, and cause the steam valve 26 to open, thereby admitting steam to heating coils 15.

If, as in a room filled with human beings, the humidity in the enclosure rises above a predetermined value (for winter about 40%), hygrostat 30 will cause an increase in pressure in line 32. As the pressure increases, damper 7 will begin to open and admit outside air, and the dampers 10 begin to close to decrease the volume of return air. Since outdoor air under winter conditions is normally quite dry, the admission of outdoor air will cause a reduction in relative humidity of air within the enclosure.

During the spring and fall when heating is required during certain hours of the day and some cooling during other hours, this system is particularly advantageous. Although the thermostat 29 may have acted to completely close off the steam supply, the hygrostat 30 will still be free to open or close the dampers to vary the humidity. By having the total volume of air pass through the conditioner, which is not the case in so-called bypass systems, larger volumes of outdoor air may be drawn in to counteract the effect of rising temperature and humidity; and this is particularly of value during intermediate seasons.

The apparatus of Fig. 2 is identical with that of Fig. 1, except for a modification of the control arrangement. The conditioner, generally designated 5, comprises a casing in which is mounted cooling coils 12, 13 and 14 and the heating coil 15. The coils 12, 13 and 14 are supplied with a cooling fluid from a refrigerating machine 17 through a supply pipe 18. The admission of cooling fluid to the coils 12, 13 and 14 is individually controlled by valves numbered respectively 35, 36 and 37. Valves 35, 36 and 37 are identical in construction with valves 23 and 24 described in connection with Fig. 1. A pipe 22, common to the coils, provides a return passageway from the coils to the refrigerating machine 17. A bypass pipe 38 joins the pipe 22 with the pipe 39 (connecting the pump 16 and refrigerating machine 17). A three-way valve 40, of well known type, is adapted to mix warm return liquid, through pipe 38, with cooled liquid from the refrigerating machine 17, under the control of the hygrostat 30, as will be hereinafter made clear.

Dampers 7, 8 and 10 operate as in the arrangement of Fig. 1.

Thermostat 29, as in Fig. 1, is adapted to vary the pressure of compressed air in a pipe 31, connecting the thermostat with steam valve 26 and liquid valves 35, 36 and 37. Valve 26 is normally open, whereas valves 35, 36 and 37 are normally closed. In practice, valve 26 will be closed when a pressure above a predetermined point is reached and valves 35, 36 and 37 respectively open as progressively higher air pressures are supplied.

Considering the operation of the apparatus of Fig. 2 under summer operating conditions, damper 8 is set to admit a constant quantity of outside air. Hand valves 33 and 34 are closed, thereby closing dampers 7 and opening dampers 10, and the refrigeration machine 17 and pump 16 are placed in operation. As the temperature in duct 9 rises, reflecting a rise in temperature within the space to be conditioned, thermostat 29 acts to increase the pressure in line 31. Assuming the steam valve is closed, when the pressure reached a predetermined value, liquid admission valve 35 will start to open. The opening of valve 35 admits cooling fluid to coils 12. Air coming into contact with the surfaces of this coil will be cooled and dehumidified, and will be mixed with the remaining untreated portion of the air passing through the conditioner. In some cases, it may be found desirable to have valve 35 of the quick acting type. If the temperature in duct 9 continues to rise, thermostat 29 will act to increase the pressure in line 31 and valves 36 and 37 will open successively to admit cooling liquid to coils 13 and 14.

Hygrostat 30, reflecting changes in humidity of air within duct 9 will act to vary the temperature of the cooling fluid by controlling the air pressure in line 32, leading to valve 40. An increase in pressure in line 32 will act on the diaphragm of valve 40 to close passage 38 and open passage 39, thereby utilizing a greater quantity of refrigerated liquid and a lesser quantity of bypassed liquid. Hence, the temperature of liquid supplied to the cooling coils will be decreased and a greater amount of cooling and dehumidification will result.

Operation of the apparatus of Fig. 2, under winter and intermediate seasonal conditions, is identical with the operation of the apparatus of Fig. 1 under corresponding conditions.

In that many changes, both in construction and design, could be made without departing from the scope of the invention, it is intended that the above description and drawing shall not be construed in any sense as limiting, but merely as illustrative of practical applications of the invention.

What I claim is:

1. In an air conditioning system, means for supplying fresh air, means for withdrawing return air from an inclosure to be conditioned, a conditioner housing for receiving said airs completely unobstructed, whereby the two airs can commingle, a plurality of transversely arranged cooling coils extending transversely completely across the housing, the plane of the coils lying in the plane of the flow of the air, means for controlling the application of refrigerant to each of said coils independently of the other, means for successively operating each of said coils depending upon the condition of the air returning from the inclosure, means of delivering the air from the air conditioner to the inclosure, and means for controlling the temperature of the refrigerant supplied to all of the coils according to the condition of the returning air, whereby air can be passed through one or more of said coils without being cooled while the resistance of all of the coils to the passage of air therethrough will be uniform.

2. In an air conditioning system, means for supplying fresh air, means for withdrawing return air from an inclosure to be conditioned, a conditioner housing for receiving said airs completely unobstructed, whereby the two airs can commingle, a plurality of transversely arranged and independent cooling coils extending transversely completely across the housing, and arranged one above the other and substantially parallel to the opposite walls of said housing, means for controlling the application of refrigerant to each of said coils independently of the other, means for successively operating each of said coils depending upon the condition of the air returning from the inclosure, means of delivering the air from the air conditioner to the inclosure, and means for controlling the temperature of the refrigerant supplied to all of the coils according to the condition of the returning air, whereby air can be passed through one or more of said coils without being cooled while the resistance of all of the coils to the passage of air therethrough will be uniform.

ABRAHAM HOMER SIMONDS.